UNITED STATES PATENT OFFICE.

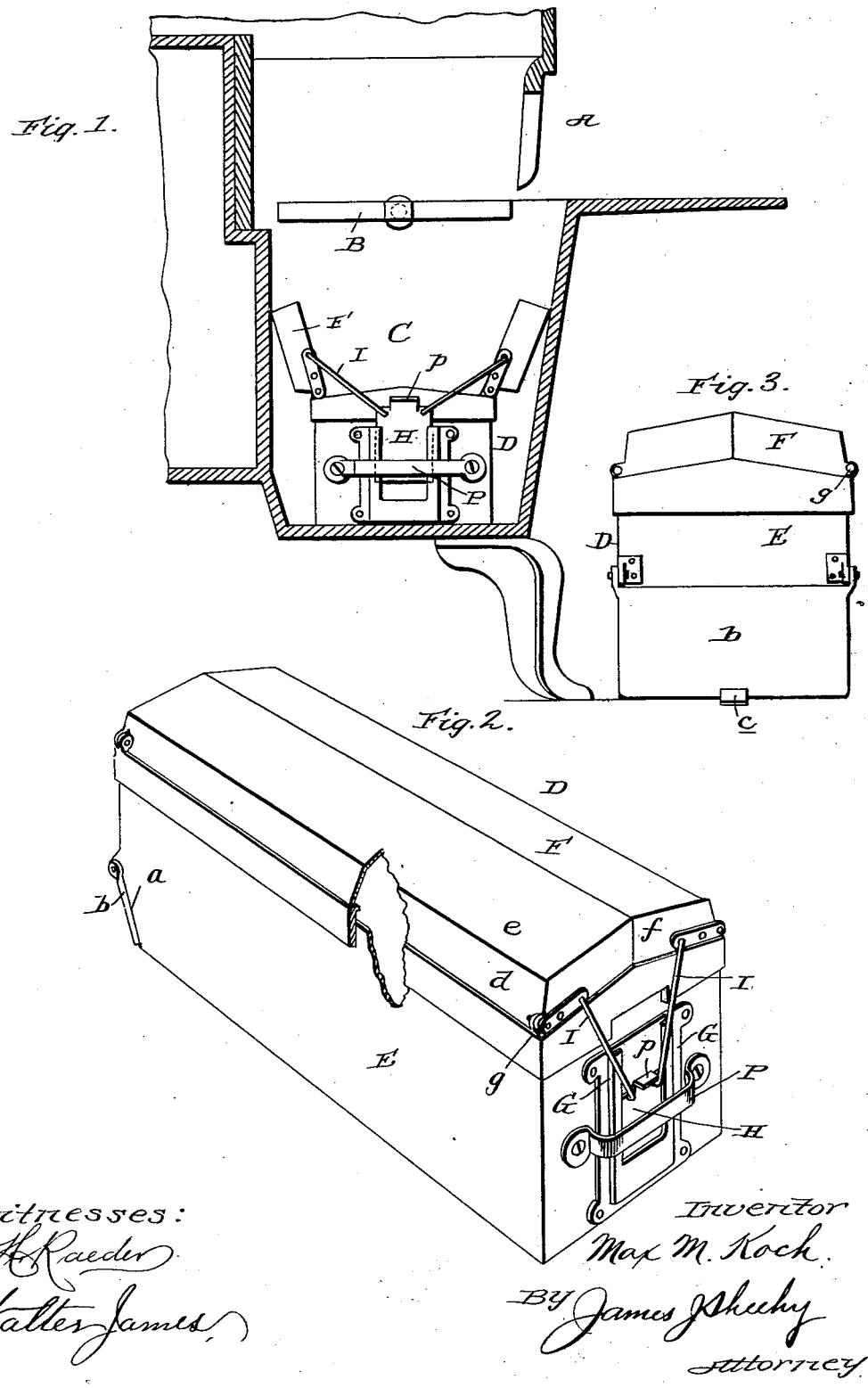

MAX M. KOCH, OF CLEVELAND, OHIO.

ASH PAN OR RECEPTACLE.

SPECIFICATION forming part of Letters Patent No. 564,755, dated July 28, 1896.

Application filed January 4, 1896. Serial No. 574,330. (No model.)

*To all whom it may concern:*

Be it known that I, MAX M. KOCH, a citizen of the United States, residing at Cleveland, in the county of Cuyahoga and State of Ohio, have invented certain new and useful Improvements in Ash Pans or Receptacles; and I do declare the following to be a full, clear, and exact description of the invention, such as will enable others skilled in the art to which it appertains to make and use the same.

My invention relates to improvements in ash pans or receptacles designed for use in stoves, ranges, and furnaces; and, like the invention disclosed in my contemporary application of even date herewith, Serial No. 574,329, it has for its general object to provide an ash pan or receptacle having a permanently-connected cover, which may be conveniently opened after the pan is placed in the ash-pit of a stove, and may as conveniently be closed before the pan is drawn from the said pit, so as to prevent the ashes from flying out of the pan and soiling the person and clothes of the attendant as well as the apartment when the pan is removed to the place where the ashes are dumped.

Other objects and advantages of the invention will be fully understood from the following description and claims when taken in conjunction with the accompanying drawings, in which—

Figure 1 is a view illustrating a portion of a stove in section and my improved receptacle in the ash-pit thereof, said receptacle being shown as open. Fig. 2 is an enlarged perspective view, partly in section, with the cover-sections in their closed position; and Fig. 3 is an elevation of the end of the receptacle opposite to that shown in Fig. 1.

In the said drawings similar letters designate corresponding parts in all the views, referring to which—

A indicates an ordinary stove having a grate B, and an ash-pit C beneath the grate, and D indicates my improved ash pan or receptacle, which comprises the body E and the hinged cover-sections F. The body E of the pan or receptacle is of a general rectangular form and is elongated to suit the ash-pits of ordinary stoves, and it is provided at one end adjacent to its bottom with a discharge-opening, and also has the ends of its walls at the side of said opening cut away, as indicated by $a$, so that the door $b$ of the opening, when closed, will be held in an inclined position by the spring-catch $c$. (Better illustrated in Fig. 3.) In virtue of this arrangement of the door $b$ it will be perceived that when said door is released from the catch $c$, which is connected to the body E, said door will tend to swing open and will not therefore retard the passage of ashes from the receptacle.

The cover-sections F of the receptacle may be of any suitable form and construction. I prefer, however, to form them as shown and have them respectively comprise an outer side wall $d$, a top wall $e$, and end walls $f$. Said cover-sections F are connected in a hinged manner with the body E at the upper corners thereof, as indicated by $g$, and they are designed to be opened after the receptacle is placed in the ash-pit of a stove and are also designed to be closed before the receptacle is removed from the stove, so as to avoid the objectionable scattering of ashes and dust which is so generally incident to removing ashes from stoves. In order that such opening and closing of the cover-sections may be quickly and easily accomplished, I have provided the vertical guides G upon the front end of the receptacle, which guides may form parts of a single frame, and a slide H, which is arranged and adapted to move between the guides G and is preferably provided with a finger-piece $p$, whereby it will be seen that the slide may be readily raised and lowered. This slide has loosely connected to it two links I, and these links are loosely connected at their opposite ends to the cover-sections F, as shown, whereby it will be perceived that when the slide H is raised the cover-sections F will also be raised so as to entirely uncover the receptacle, as shown in Fig. 1, while when the slide H is moved downwardly the cover-sections will be drawn down to their closed position, (shown in Fig. 2,) so as to thoroughly cover the receptacle and prevent the escape of ashes or dust therefrom.

In using the ash pan or receptacle it is grasped by the handle P and placed in the ash-pit of a stove while the cover-sections are in their closed position, and the slide H is then raised so as to open the cover-sections to the position shown. When the cover-sections are entirely open, it will be perceived that the receptacle is but slightly increased in width, which is an advantage, because it admits of the receptacle being placed and opened in ash-pits of the usual size, and it will also be seen that when in their open position the cover-sections, by reason of their peculiar form, will catch and hold any ashes that might tend to fall between the body of the receptacle and the walls of the ash-pit.

When the receptacle is filled with ashes and it is desired to remove it, it is simply necessary for the attendant to lower the slide H, and thereby lower the cover-sections F. The receptacle is then thoroughly closed and may be removed to the dump without the ashes flying about, which is a desideratum. When the dump is reached, it is simply necessary for the operator to release the door $b$ from the catch $c$, when the ashes will be discharged from the receptacle without the creation of a cloud of dust. When the door $b$ is closed and fastened, the receptacle is ready to be carried back to and placed in the stove.

Like the receptacle disclosed in my aforesaid contemporary application, it will be appreciated that the receptacle of the present application may be thoroughly closed while it is in the stove and while it is being carried to and from the same, and that therefore ashes may be removed from the stove without getting ashes and dust upon the furniture and floor of the apartment in which the stove is situated and without soiling the person and clothes of the party who removes the ashes.

Having described my invention, what I claim, and desire to secure by Letters Patent, is—

1. An ash pan or receptacle comprising a body, and cover-sections connected in a hinged manner to the upper edges of the body and respectively comprising an outer side wall, a top wall and end walls, the said cover-sections being adapted, when opened, to catch and hold any ashes that might tend to fall between the body of the receptacle and the walls of the ash-pit of a stove, substantially as and for the purpose set forth.

2. An ash pan or receptacle comprising a body, cover-sections connected in a hinged manner with the body, and a vertically-movable slide arranged at the forward end of the body and connected with the cover-sections, substantially as and for the purpose set forth.

3. An ash pan or receptacle comprising a body having a discharge-opening in one of its end walls and also having a door for closing said opening, cover-sections connected in a hinged manner to the upper edges of the body-sections and respectively comprising an outer side wall, a top wall and end walls, a slide arranged in suitable guides upon the forward end wall of the body, and links connecting said slide and the cover-sections, substantially as and for the purpose set forth.

In testimony whereof I affix my signature in presence of two witnesses.

MAX M. KOCH.

Witnesses:
L. ERBEN,
P. KNAPPENBERGER.